(12) United States Patent
Herbert et al.

(10) Patent No.: US 12,121,967 B2
(45) Date of Patent: Oct. 22, 2024

(54) METAL POWDER MANAGEMENT SYSTEM FOR ADDITIVE MANUFACTURING

(71) Applicant: Carpenter Technology Corporation, Philadelphia, PA (US)

(72) Inventors: Francis William Herbert, Philadelphia, PA (US); John Robert Rushton, Cheshire (GB); Nicholas Paul Weeks, Over Peover (GB); Ben Ian Ferrar, Devon, PA (US); Christopher Wooder, Wirral (GB); Philip Anthony Carroll, Cheshire (GB)

(73) Assignee: Carpenter Technology Corporation, Philadelphia, PA (US)

( * ) Notice: Subject to any disclaimer, the term of this patent is extended or adjusted under 35 U.S.C. 154(b) by 0 days.

(21) Appl. No.: 17/683,899

(22) Filed: Mar. 1, 2022

(65) Prior Publication Data

US 2022/0274180 A1    Sep. 1, 2022

Related U.S. Application Data

(60) Provisional application No. 63/155,170, filed on Mar. 1, 2021.

(51) Int. Cl.
*B22F 10/73* (2021.01)
*B22F 10/80* (2021.01)
(Continued)

(52) U.S. Cl.
CPC .............. *B22F 10/73* (2021.01); *B22F 10/80* (2021.01); *B22F 12/58* (2021.01); *B33Y 10/00* (2014.12); *B33Y 40/10* (2020.01); *B33Y 50/00* (2014.12)

(58) Field of Classification Search
CPC .......... B22F 10/73; B22F 10/80; B22F 12/58; B22F 10/14; B22F 10/16; B22F 2999/00;
(Continued)

(56) References Cited

U.S. PATENT DOCUMENTS

| | | |
|---|---|---|
| 4,938,816 A | 7/1990 | Beaman et al. |
| 5,527,877 A | 6/1996 | Dickens, Jr. et al. |

(Continued)

FOREIGN PATENT DOCUMENTS

| | | |
|---|---|---|
| CN | 102380264 A | 3/2012 |
| CN | 105965013 A | 9/2016 |

(Continued)

OTHER PUBLICATIONS

Barbosa et al., "An IoT-Based Solution for Control and Monitoring of Additive Manufacturing Processes," Journal of Powder Metallurgy & Mining, J. Poweder Metall Min. 6:1 1000158, 7 pgs. (2017).

(Continued)

*Primary Examiner* — Rebecca Janssen
(74) *Attorney, Agent, or Firm* — Goodwin Procter LLP

(57) ABSTRACT

Closed-loop metal powder management methods for additive manufacturing. Virgin metal powder is provided in a closed powder container comprising at least one sensor, tracker, or optical device. The metal powder is transferred to an additive manufacturing system, a portion of a metal powder layer is consolidated, and excess metal powder is transferred from the additive manufacturing system to the powder container, a second powder container, or an internal powder container. Virgin metal powder or a second metal powder are added to the excess metal powder, a quality of the mixed powder is validated, the process is repeated at least once, and powder physical transfer data associated with at least one of the steps is collected and stored in a data (Continued)

repository. Powder material parameters may be measured and assessed, and may be also be stored in the data repository.

27 Claims, 7 Drawing Sheets

(51) Int. Cl.
*B22F 12/58* (2021.01)
*B33Y 10/00* (2015.01)
*B33Y 40/10* (2020.01)
*B33Y 50/00* (2015.01)

(58) Field of Classification Search
CPC .......... B22F 10/20; B22F 10/34; B22F 10/39; B33Y 10/00; B33Y 40/10; B33Y 50/00; B33Y 40/00; B33Y 50/02; B33Y 70/00; Y02P 10/25

See application file for complete search history.

(56) References Cited

U.S. PATENT DOCUMENTS

| | | | |
|---|---|---|---|
| 6,110,411 | A | 8/2000 | Clausen et al. |
| 6,433,030 | B1 | 8/2002 | Blatter et al. |
| 6,694,207 | B2 | 2/2004 | Darrah et al. |
| 6,930,278 | B1 | 8/2005 | Chung et al. |
| 6,989,115 | B2 | 1/2006 | Russell et al. |
| 6,995,334 | B1 | 2/2006 | Kovacevic et al. |
| 7,261,542 | B2 | 8/2007 | Hickerson et al. |
| 7,706,910 | B2 | 4/2010 | Hull et al. |
| 7,887,316 | B2 | 2/2011 | Cox |
| 8,591,797 | B2 | 11/2013 | Monsheimer et al. |
| 8,777,602 | B2 | 7/2014 | Vermeer et al. |
| 9,126,167 | B2 | 9/2015 | Ljungblad |
| 9,821,543 | B1 | 11/2017 | Crear et al. |
| 10,166,718 | B2 | 1/2019 | Park et al. |
| 10,357,827 | B2 | 7/2019 | Shaw et al. |
| 10,399,145 | B2 | 9/2019 | McMurtry et al. |
| 10,449,606 | B2 | 10/2019 | Morris et al. |
| 10,576,540 | B2 | 3/2020 | Dellea et al. |
| 10,773,305 | B2 | 9/2020 | Beauchamp |
| 2005/0263933 | A1 | 12/2005 | Welch et al. |
| 2007/0290410 | A1 | 12/2007 | Koo et al. |
| 2008/0211132 | A1 | 9/2008 | Feenstra |
| 2010/0161102 | A1* | 6/2010 | Mattes .................. B33Y 40/00 700/120 |
| 2010/0192806 | A1 | 8/2010 | Heugel et al. |
| 2011/0223349 | A1 | 9/2011 | Scott |
| 2016/0193696 | A1 | 7/2016 | McFarland et al. |
| 2017/0246810 | A1 | 8/2017 | Gold |
| 2017/0252805 | A1 | 9/2017 | Gillespie et al. |
| 2018/0021855 | A1 | 1/2018 | De Lajudie et al. |
| 2018/0370144 | A1 | 12/2018 | Revanur et al. |
| 2019/0193154 | A1 | 6/2019 | Ocken et al. |
| 2019/0240915 | A1 | 8/2019 | Soriano Fosas et al. |
| 2020/0115574 | A1 | 4/2020 | Querol Esparch et al. |
| 2020/0147889 | A1 | 5/2020 | Dheeradhada et al. |
| 2020/0254691 | A1 | 8/2020 | Mamrak et al. |
| 2021/0031270 | A1* | 2/2021 | Muranaka ............... B22F 10/34 |

FOREIGN PATENT DOCUMENTS

| | | | |
|---|---|---|---|
| DE | 20107262 | U1 | 8/2001 |
| EP | 2087031 | A1 | 8/2009 |
| EP | 3228441 | A1 | 10/2017 |
| EP | 3281729 | A1 | 2/2018 |
| EP | 3389995 | A1 | 10/2018 |
| EP | 3510101 | A1 | 7/2019 |
| JP | 4404572 | B2 | 1/2010 |
| KR | 20180044280 | A | 5/2018 |
| WO | WO-2015025171 | A2 | 2/2015 |
| WO | WO-2017085469 | A1 | 5/2017 |
| WO | WO-2018217896 | A1 | 11/2018 |
| WO | WO-2019055576 | A1 | 3/2019 |
| WO | WO-2019110899 | A1 | 6/2019 |
| WO | WO-2019147266 | A1 | 8/2019 |
| WO | WO-2020053535 | A1 | 3/2020 |
| WO | WO-2021003271 | A2 * | 1/2021 .............. B22F 10/00 |

OTHER PUBLICATIONS

Finex, R., "Powder Handling and Sieving Solutions for the Additive Manufacturing Industry," Manufacturing Tomorrow (2018).
International Search Report and Written Opinion mailed Jun. 24, 2022 in PCT/US2022/018337, 12 pages.
PowderLife LPW, "Powders, products and solutions to support AM in production", Lpwtechnology.com (Nov. 3, 2017).

* cited by examiner

METAL POWDER MANAGEMENT SYSTEM FOR ADDITIVE MANUFACTURING

RELATED APPLICATION

This application claims priority to and the benefit of U.S. Provisional Patent Application Ser. No. 63/155,170, filed Mar. 1, 2021, the entire contents of which are incorporated by reference herein.

BACKGROUND

Additive manufacturing generally relates to the process of manufacturing 3D objects by building up layers of a material or materials. Conventionally, the materials may be supplied to additive manufacturing machines in the form of powders (e.g., metal powders).

Powders have a range of physical and chemical characteristics that are known to be important to their processability, i.e., that make them either suitable or unsuitable for additive manufacturing. Several of these characteristics are inherent to the material itself, while others may be affected by the powder's surrounding environment. For example, the properties of powders may be affected by ambient humidity, reactive gases in the atmosphere, contaminants such as other powders and foreign objects, electrostatic forces, and other extraneous factors. Since the characteristics of the powder impact the properties of additively manufactured articles, it is important that such factors are monitored and controlled in the interest of quality.

Furthermore, powders in additive manufacturing may be reused (recycled) through the process more than once. The recycling of powders leads to detectable degradation or changes in the material characteristics which can also impact the performance and final quality of additively manufactured articles.

SUMMARY

Embodiments of the invention include a closed-loop system that enables the user to track metal powder from original production to its ultimate use in an additively manufactured part. The system maintains the metal powder under a controlled atmosphere and retains digitally-documented quality controls for detailed traceability, material genealogy, and risk management against contamination, excess humidity, powder oxidation, and other undesired occurrences. Moreover, the system allows the user to add or combine virgin (i.e., unused) metal powder with used metal powder that is recycled from an additive manufacturing process, validate its quality, while maintaining the metal powders under a controlled or inert atmosphere with associated environmental monitoring and documented quality controls that are trackable down to the material's batch and sub-batch identification.

A benefit of the system described herein is that metal powder managed within the system has a unique digital fingerprint that can be linked back to any combination of: physical transfer history, environmental conditions, materials property data, process history, and other factors. This allows the user to make intelligent decisions on how to proceed, such as re-use of the metal powder, scrap the powder, re-test powder, etc.

In an aspect, embodiments of the invention relate to a closed-loop metal powder management method for additive manufacturing. The method includes obtaining a virgin metal powder suitable for additive manufacturing, the metal powder being disposed in a closed powder container including at least one sensor, tracker, and/or optical device. The powder container is connected to an additive manufacturing system with an automated metal powder transfer system to perform powder transfer in a closed loop, with the automated metal powder transfer system being controllable by a pneumatic and/or an electronic (e.g., a programmable logic) controller and is adapted to control delivery of a metered amount of metal powder to the additive manufacturing system.

Metal powder from the powder container is delivered to the additive manufacturing system. The additive manufacturing system is operated to form at least one layer of the metal powder over a build plate of the additive manufacturing system. A portion of the at least one metal powder layer is consolidated, with an excess portion of the metal powder layer remaining in powder form. These two steps are repeated at least once.

The excess metal powder is transferred from the additive manufacturing system into the powder container, a second powder container, or an internal powder container. Virgin metal powder is added to excess metal power in the powder container, the second powder container, or the internal powder container to form a mixed powder, and a quality of the mixed powder is validated. The preceding steps, starting with connecting the metal powder to an additive manufacturing system, are repeated at least once with the validated mixed powder. Powder physical transfer data associated with at least one of the above steps is collected, and stored in a data repository. The sensor, tracker, and/or optical device is electronically accessible during each of these steps.

One or more of the following features may be included. The least one sensor is adapted to measure at least one of oxygen in the powder container, a temperature in the powder container, humidity in the powder container, pressure in the powder container, color of powder in the powder container, a morphology of the powder in the powder container, a level of the powder disposed in the powder container, a mass of the powder disposed in the powder container, and/or contamination in the powder disposed in the powder container.

The metal powder and excess metal powder may be maintained under an inert atmosphere during each of the steps.

At least one powder material parameter of the excess metal powder may be measured.

The mixed powder may be sifted through a sieve prior to repeating the steps with the validated powder.

The mixed powder may be blended prior to validation.

Delivering metal powder from the powder container to the additive manufacturing system may include delivering the metal powder to a powder storage silo within the additive manufacturing system, with a quantity of delivered metal powder being sufficient to form at least two layers of powder.

Consolidating at least a portion of the metal powder layer may include binding, sintering, and/or melting.

Validating the quality of the mixed powder may include (i) measuring and assessing at least one powder material parameter of the mixed powder, and//or (ii) reviewing powder physical transfer data.

The at least one powder material parameter of the mixed powder may be stored in the data repository.

The powder material parameter of the mixed powder may be interstitial element chemistry, substitutional element chemistry, trace element analysis, apparent density, tap density, particle size distribution, humidity, powder shape, powder morphology, Hall flow, Carney flow, sieve specification, trapped gas content, rheometry stability index, and/or angle of repose.

Measuring the at least one powder material parameter of the mixed powder may include capturing an optical image, capturing a scanning electron microscopy image, capturing a cross-sectional image, performing coulometric titration, and/or performing a pycnometry measurement.

The powder physical transfer data may include powder storage data, identification of the additive manufacturing system, a number of times the metal powder was delivered to the additive manufacturing system, and/or number of times the powder was mixed with virgin metal powder.

Process data associated with at least one of the above steps may be collected, and may be stored in the data repository. The process data may include laser power during the consolidation step, a velocity of the laser during the consolidation step, and/or or a thickness of a layer formed. Validating the quality of the mixed powder may include reviewing the collected process data.

The closed powder container may include a shipping powder container in which the virgin metal powder is shipped after manufacture thereof. Virgin metal powder may be transferred from a shipping powder container into the closed powder container prior to performance of the steps outlined above.

In another aspect, embodiments of the invention relate to a closed-loop metal powder management method for additive manufacturing, the method including obtaining a first metal powder suitable for additive manufacturing, the first metal powder being disposed in a closed powder container including at least one sensor, tracker, or optical device. The powder container is connected to an additive manufacturing system with an automated metal powder transfer system to perform metal powder transfer in a closed loop, wherein the automated metal powder transfer system is controllable by a programmable logic controller and is adapted to control delivery of a programmed amount of metal powder to the additive manufacturing system.

Metal powder is delivered from the powder container to the additive manufacturing system. The additive manufacturing system is operated to form at least one layer of the metal powder over a build plate of the additive manufacturing system. A portion of the at least one metal powder layer is consolidated, with an excess portion of the metal powder layer remaining in powder form. These two steps are repeated at least once.

The excess metal powder is transferred from the additive manufacturing system to an excess powder container including at least one excess metal powder container sensor, excess powder container tracker, or excess powder container optical device. A second metal powder is added to the excess powder container to form a mixed powder. A quality of the mixed powder in the excess powder container is validated.

The preceding steps, starting with connecting the metal powder to an additive manufacturing system, are repeated at least once with the validated mixed powder disposed in the excess powder container. Powder physical transfer data associated with at least one of the above steps is collected, and stored in a data repository. At least one of the at least one sensor, tracker, optical device, excess powder container sensor, excess powder container tracker, and/or excess powder container optical device is electronically accessible during each of the above steps.

One or more of the following features may be included. The first metal powder and the second metal powder may have a same composition, e.g., they may be from a single batch. The first metal powder and second metal powders may be from different batches. The first metal powder may be a virgin metal powder.

The least one sensor may be adapted to measure at least one of oxygen in the powder container, a temperature in the powder container, humidity in the powder container, pressure in the powder container, color of powder in the powder container, a morphology of the powder in the powder container, a level of the powder disposed in the powder container, a mass of the powder disposed in the powder container, and/or contamination in the powder disposed in the powder container.

The excess powder container may include an internal or an external powder container.

The first metal powder, second metal powder, excess metal powder, and mixed powder may be maintained under an inert atmosphere during the above steps.

At least one powder material parameter of the excess metal powder may be measured.

The mixed powder may be sifted through a sieve prior to repeating the steps with the validated powder.

The mixed powder may be blended prior to validation.

Delivering metal powder from the powder container to the additive manufacturing system may include delivering the metal powder to a powder storage silo within the additive manufacturing system, and with a quantity of delivered metal powder being sufficient to form at least two layers of metal powder.

Consolidating at least a portion of the metal powder layer may include binding, sintering, and/or melting.

Validating the quality of the mixed powder may include (i) measuring and assessing at least one powder material parameter of the mixed powder and/or (ii) reviewing powder physical transfer data. At least one powder material parameter of the mixed powder may be stored in the data repository.

The powder physical transfer data may include powder storage data, identification of the additive manufacturing system, a number of times the powder was delivered to the additive manufacturing system, and/or a number of times it was mixed with the second powder.

Process data associated with at least one of the above steps may be collected; the collected process data may be stored in the data repository. The process data may include a laser power during the consolidation step, a velocity of the laser during the consolidation step, or a thickness of a layer formed. Validating the quality of the mixed powder may include reviewing the collected process data.

The powder material parameter of the mixed powder may be interstitial element chemistry, substitutional element chemistry, trace element analysis, apparent density, tap density, particle size distribution, humidity, powder shape, powder morphology, Hall flow, Carney flow, sieve specification, trapped gas content, rheometry stability index, and/or angle of repose.

Measuring the at least one powder material parameter of the mixed powder may include capturing an optical image, capturing a scanning electron microscopy image, capturing a cross-sectional image, performing coulometric titration, and/or performing a pycnometry measurement.

The closed powder container may include a shipping powder container in which the first metal powder is shipped after manufacture thereof. The first metal powder may be a virgin metal powder, and the first metal powder may be transferred from a shipping powder container into the closed meal powder container prior to performance of the steps outlined above.

In still another aspect, embodiments of the invention relate to a continuous closed-loop metal powder management method for additive manufacturing. The method includes transferring, by use of an automated metal powder transfer system, a virgin metal powder suitable for additive manufacturing from a hopper comprising at least one sensor, tracker, or optical device to a closed powder container comprising at least one container sensor, container tracker, or container optical device. The powder container is connected to an additive manufacturing system to perform powder transfer in a closed loop.

Metal powder from the powder container is delivered to the additive manufacturing system. The additive manufacturing system is operated to form at least one layer of the metal powder over a build plate of the additive manufacturing system. A portion of the at least one metal powder layer is consolidated, with an excess portion of the metal powder layer remaining in powder form. These two steps are repeated at least once.

The excess metal powder is transferred from the additive manufacturing system into the powder container, a second container, or an internal powder container. Virgin metal powder is added to the powder container, the second container, or the internal powder container to form a mixed powder, and a quality of the mixed powder is validated. The preceding steps, starting with connecting the metal powder to an additive manufacturing system, are repeated at least once with the validated mixed powder. Powder physical transfer data associated with at least one of the above steps is collected, and stored in a data repository. The sensor, tracker, optical device, container sensor, container tracker, and/or container optical device is electronically accessible during each of these steps.

DETAILED DESCRIPTION

Closed-Loop Metal Powder Management Description and Advantages

Figure 1:
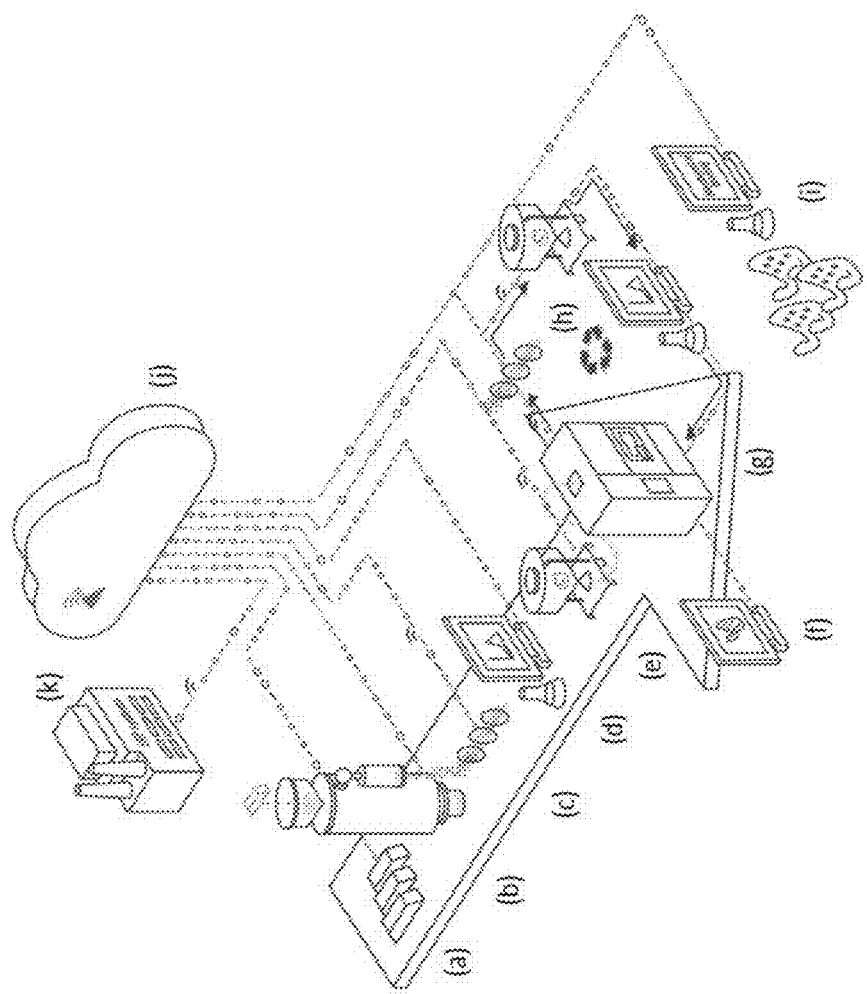
FIG. 1 is a schematic diagram illustrating a closed-loop metal powder management system for additive manufacturing, in accordance with an embodiment of the invention.

Referring to FIG. 1, a closed-loop metal powder management system 100 for additive manufacturing, in accordance with an embodiment of the invention, includes (a) raw material feedstock used to produce metal powders (e.g., raw elemental or pre-alloyed mastermelt), (b) metal powder atomizer, (c) screening operations, (d) laboratory test to certify the characteristics of as-produced metal powders, (e) metal powder container, e.g., a hopper, charged with as-produced metal powders, (f) a digitally prepared additively manufacturing design (also known as "build file"), (g) additive manufacturing machine, (h) recycling of metal powder which may comprise re-screening, charging or combining batches between different hoppers, and re-testing the powder characteristics, and (i) additively manufactured articles and test specimens fabricated by consolidating the metal powder in the additive manufacturing machine. Data is collected from each of these operations and captured by, e.g., a cloud-based software system (j) that can be connected to an institution's enterprise resource planning (ERP) or central IT systems (k) for the purpose of data aggregation and analysis.

Figure 2:
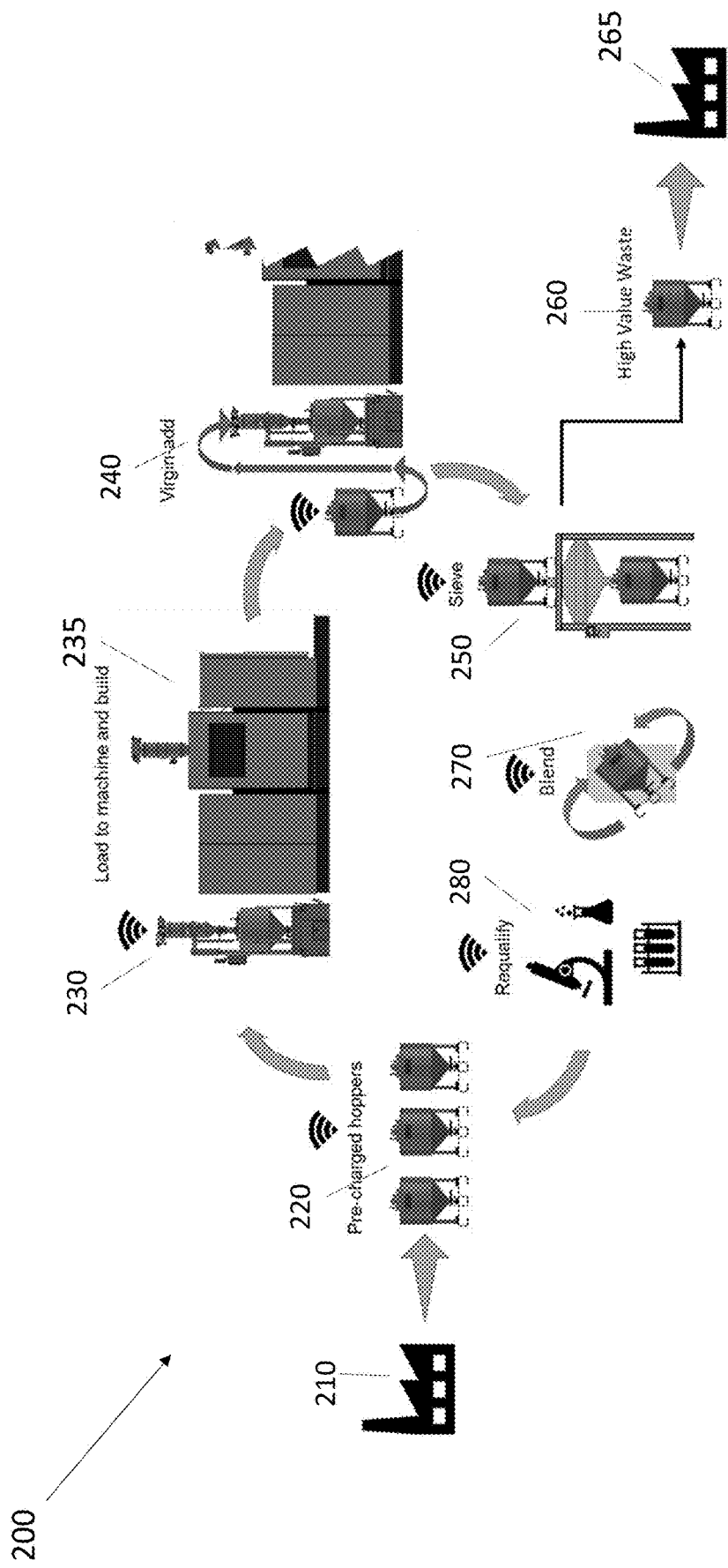
FIG. 2 is a schematic diagram illustrating a closed-loop metal powder management system for additive manufacturing on large powder-bed systems, in accordance with an embodiment of the invention.

Referring to FIG. 2, a closed-loop metal powder management system 200 for additive manufacturing on large powder-bed systems, in accordance with an embodiment of the invention, includes the production facility 210 from where metal powder is sourced, containers 220, e.g., hoppers, that are pre-charged with virgin, used (excess), or blended (mixed) metal powder, an automated decanting system 230 to automatically dock the containers and load metal powder into an additive manufacturing machine 235, a powder addition station 240 for adding virgin metal powder to a (semi)-depleted container under a controlled environment 240, a sieving station 250 to transfer metal powder from one container to another and remove unwanted oversized particles and unwanted agglomerates, an extraction station 260 for extracting high value waste from the production stream for raw material recycling 265, a blending station 270 for blending a combined batch of metal powder within a fully sealed container, and laboratory testing 280 of retained samples of combine/blended powders to verify the material's quality before returning the container to the production cycle. The wifi icons at each station illustrate wireless data transfer from smart devices within the closed-loop system to be captured in a data repository, e,g., a centralized software database.

The powder management system depicted in FIG. 2 is an example of a batch processing system. Batch processing refers to sequentially adding and/or removing material to/from an additive manufacturing system in a controlled manner, such that the entirety of the powder material may be traced back clearly to original material lots. Batch processing includes providing externally mixed or blended lots to the additive manufacturing system, whereby the feedstock powder is removed from the system following a build cycle to replenish, sieve and/or mix with more powder from the same or different batches outside of the system, before re-filling the system.

Continuous processing refers to adding batches of material to an additive manufacturing system that contains an internal powder recirculation loop. In this manner, externally held powder from one or more batches is added to the AM system following each build cycle. However, after filling, powder is typically not removed from the system but instead allowed to accumulate in an internal container. After each build cycle, more powder feedstock is delivered from the internal container to start a new build sequence. The powder in circulation may therefore include a growing set of lots that are mixed in different relative fractions. At any one time, the exact composition of the powder in terms of sub-batches or lots is therefore unknown, but the original lot identifiers of all powder inserted into the machine may be tracked as they are added.

The internal container is a hopper, bin, collector, or other vessel that is plumbed into the additive manufacturing system as a fixed powder silo. The internal container is typically fabricated from stainless steel or a similar material. Excess powder that accumulates following a build is recirculated from the AM system overflow bin, build chamber, and/or depowdering space back to the internal container to await the next build preparation sequence. Typically, the powder is sieved in-line to remove oversize particles before returning to the internal container, without the powder being removed from the system. In certain embodiments, the internal container is housed within a piece of equipment separate from the additive manufacturing build chamber, with the internal container being linked by closed loop pipework such that powder does not need to be removed from the overall system. These multi-equipment, closed loop systems may be referred to commercially as, e.g., automatic powder recovery systems, ICPM, ICM, etc.

Figure 3:
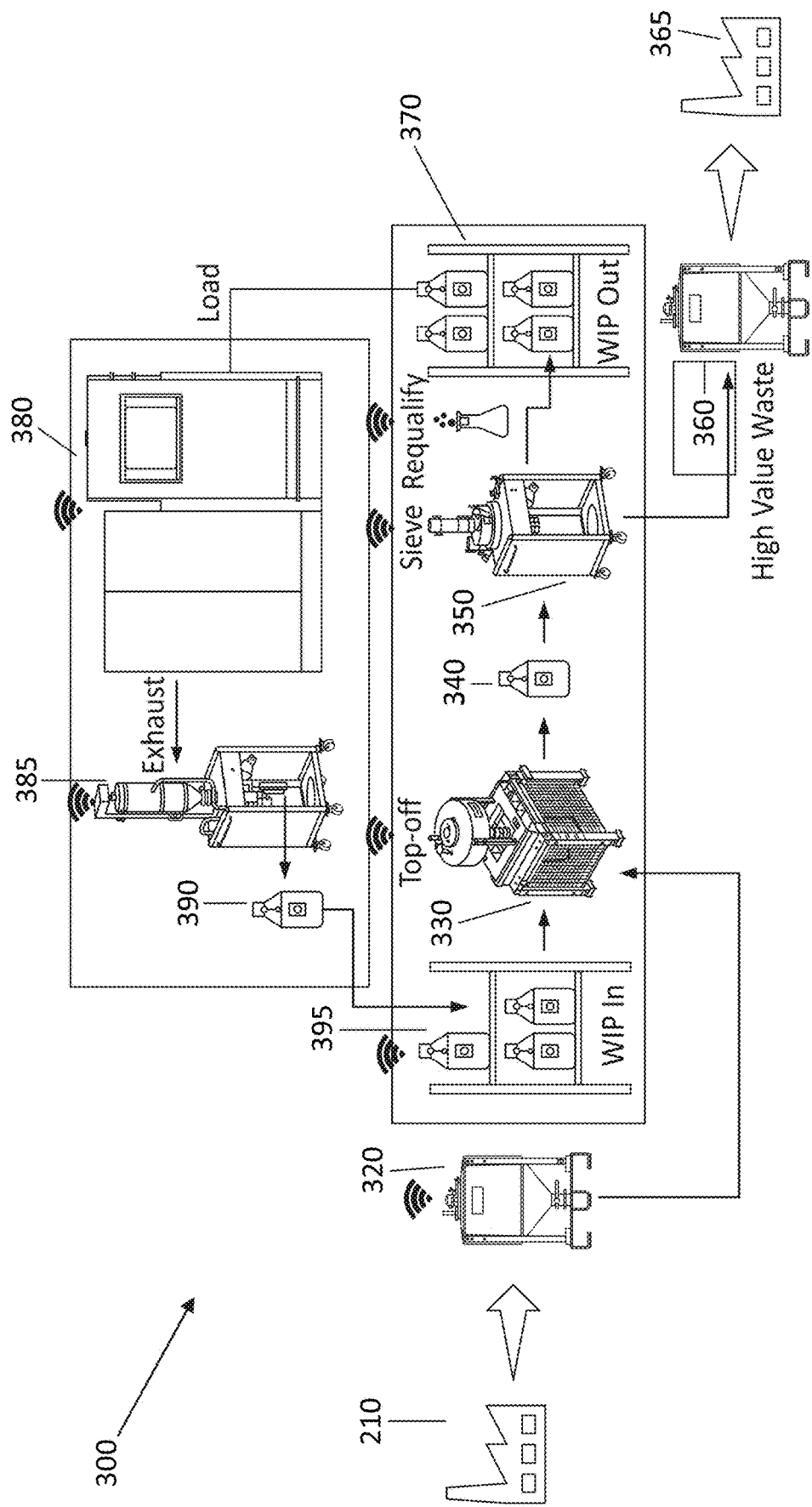
FIG. 3 is a schematic diagram illustrating a closed-loop metal powder management system for additive manufacturing on small powder-bed systems which utilize reduced-volume containers, in accordance with an embodiment of the invention.

Referring to FIG. 3, a closed-loop metal powder management system 300 for additive manufacturing on small powder-bed systems that utilize reduced-volume containers, in accordance with an embodiment of the invention, includes: the production facility 210 from where metal powder is sourced, a container 320, e.g., a hopper, that is pre-charged with virgin, used, or blended metal powder, an automated decanting system 330 to transfer metal powder ("top off") from a larger hopper into a semi-depleted, reduced-volume second container, a fully charged reduced-volume second container 340, a sieving station 350 to remove unwanted oversized particles and unwanted agglomerates, an extraction station 360 for extracting high value waste from the production stream for raw material recycling 365, a staging location 370 for pre-charged containers ("Work in Progress (WIP) Out" inventory), an additive manufacturing machine 380 that is loaded with metal powder from powder containers, an exhaust stream 385 of used powder from machine charged into a semi-vacated container, a container 390 with used metal powder, and a staging location 395 for used powder containers ("WIP in"). The wifi icons at each station illustrate wireless data transfer from smart devices within the closed-loop system to be captured in a data repository, e.g., a centralized software database.

The closed-loop systems depicted in e.g., FIGS. 1-3 allow the user to run both batch and continuous additive manufacturing operations while maintaining "behind the scenes" traceability for peace of mind that at any point an audit or search of the metal powder's history may be performed. The systems store all data captured by the user in one place to generate a digital "fingerprint" and genealogy of the powder. The data may include statistical process controls (SPCs), key process variables (KPVs), ambient/environmental information, real time tracking information, powder physical and chemical characteristics, and other relevant information defined by the user, that may be specific to their process or component being manufactured.

Referring to FIGS. 1-3, the systems described herein are closed-loop, vertically integrated supply chains all the way from the metal powder factory to ensure full chain of custody and source provenance of the material.

The metal powder used in embodiments of the invention is an elemental metal or alloy of two or more metals that have been broken down into particulate form. The powder may comprise a single metallic element, blended elemental particles, or pre-alloyed particles. Typical metals and alloy powders include those based on iron, nickel, cobalt, titanium, copper, aluminum, niobium, zirconium, and other primary elements. For example, a conventional alloyed powder is titanium-6 aluminum-4 vanadium ("Ti6Al4V"). Particles may be spherical, needle-like, agglomerated, or amorphous in shape. The typical size of particles is in the range 1 µm to 250 µm. Metal powder may be manufactured using gas atomization, water atomization, plasma atomization, centrifugal processing, and other fabrication methods.

Metal powder material is shipped in containers, such as pre-charged hoppers or other containers that remain the integral "base units" for powder transport throughout the full additive manufacturing and recycling process. In this regard the hopper acts analogously to a print cartridge in inkjet printers, which can be charged with ink, directly connected to a printer, and once emptied, be returned to the original manufacturer for environmentally friendly disposal, cleaning, or replenishment with fresh ink.

Within the closed loop, a controlled or inert atmosphere is not broken from atomization to printed parts. The atmosphere may be monitored for escapes or deviations from desired conditions, allowing the user to make informed decisions about whether to proceed with an operation. For example, containers containing metal powder may be backfilled with an inert gas such as argon or nitrogen up to a pressure of 0.2 Bar, which does not constitute being a pressure vessel per code.

The metal powder remains in contact with the inert atmosphere from the time of loading at the production facility throughout the process steps depicted in FIGS. 1-3 to eliminate or significantly reduce human exposure to metal powder. Fine powders used for additive manufacturing may present health hazards including respiratory problems, allergic reactions, carcinogenic, or other negative effects if they come in direct contact with operators. Currently available additive manufacturing systems require one or multiple steps during which metal powder is exposed in open containers. A fully closed loop as depicted in FIGS. 1-3 eliminates all points of potential operator exposure.

Figure 4:
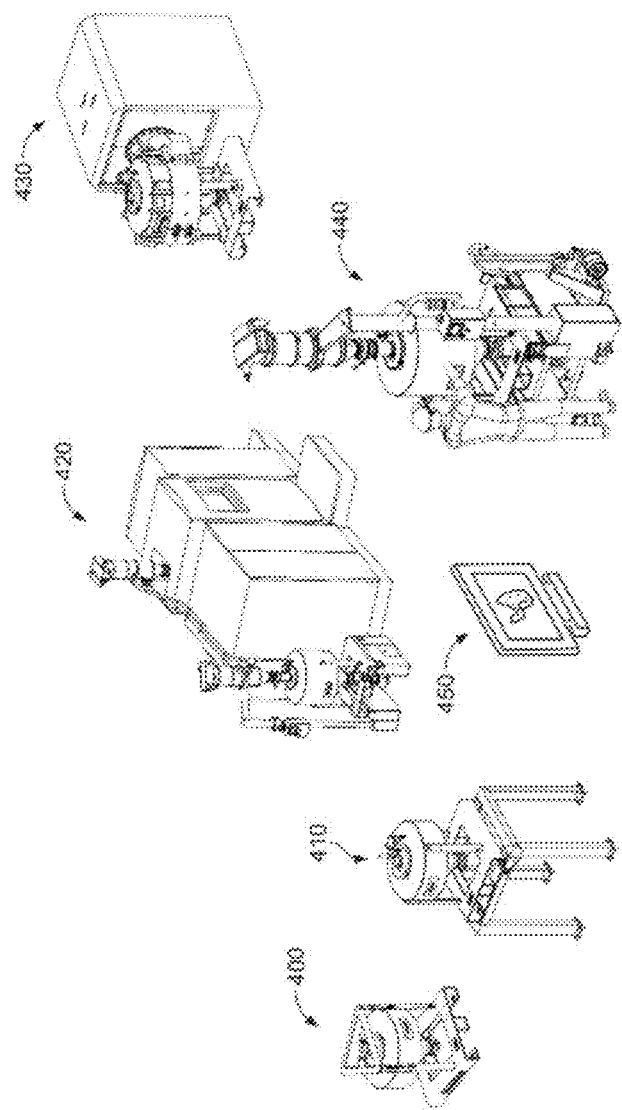
FIG. 4 is an engineering sketch illustrating examples of equipment that can be used within the metal powder management system, in accordance with embodiments of the invention.

Referring to FIG. 4, an engineering drawing includes perspective views of various equipment that may be used in closed-loop metal powder management systems. This equipment includes containers such as hoppers 400, a decanting system 410, an automated metal powder transfer system 420, an automated blending system 430, an automated decanting system 430, and a software ecosystem 440.

Continuous Closed-Loop Metal Powder Management Methods for Additive Manufacturing Closed-loop metal powder management systems, such as the systems depicted in FIGS. 1-3, may be used for additive manufacturing as follows.

In an embodiment, metal powder from a closed container may be used for additive manufacturing, excess metal powder may be transferred into the original closed container, virgin metal powder added to the excess metal powder to make a mixed powder (also referred to herein as blended powder), and the mixed powder may then be used for additive manufacturing.

In particular, a virgin metal powder suitable for additive manufacturing may be obtained, with the metal powder being disposed in a closed powder container including a sensor, tracker, and/or optical device. The closed container may be a shipping container in which the virgin metal powder is shipped after manufacture thereof. Alternatively, virgin metal powder from a shipping powder container may be transferred, directly or indirectly, into the closed powder container by, e.g., using an automated metal powder transfer system, such as an automated docking system (see FIG. 6b and related discussion). In this embodiment, the shipping powder container includes a sensor, tracker, and/or optical device, and the closed powder container includes a container sensor, a container tracker, and/or a container optical device.

The powder container is connected to an additive manufacturing system to perform metal powder transfer in a closed loop. In some embodiments, the powder container is connected to the additive manufacturing system with an automated metal powder transfer system to perform metal powder transfer in a closed loop, with the automated metal powder transfer system being controllable by a pneumatic controller and/or an electronic controller such as a programmable logic controller, and adapted to control delivery of a metered amount of metal powder to the additive manufacturing system. Further details about automated metal powder transfer systems are provided below with respect to FIGS. 6a-6c.

Metal powder is delivered from the powder container to the additive manufacturing system. Delivering the metal powder may include delivering the powder to a powder storage silo within the additive manufacturing system, with a quantity of delivered metal powder being sufficient to form at least two layers of metal powder during the subsequent additive manufacturing step.

The additive manufacturing system is operated to form at least one layer of the metal powder over a build plate of the additive manufacturing system. A portion of the at least one metal powder layer may be consolidated, with an excess portion of the metal powder layer remaining in powder form. Consolidation may include binding, sintering, and/or melting.

After the metal powder delivery and consolidation steps are repeated at least once, the excess metal powder from the additive manufacturing system is transferred into the powder container or a second powder container (in the case of batch processing), or an internal powder container (in the case of continuous processing). Virgin metal powder is added to the excess metal powder in the powder container, second powder container, or internal powder container to form a mixed powder. The mixed powder, in some embodiments, may be blended.

A quality of the mixed powder is validated. Validating the mixed powder may include measuring and assessing at least one powder material parameter of the mixed powder, such as interstitial element chemistry, substitutional element chemistry, trace element analysis, apparent density, tap density, particle size distribution, humidity, powder shape, powder morphology, Hall flow, Carney flow, sieve specification, trapped gas content, rheometry stability index, and/or angle of repose. The measurement of the at least one powder material parameter of the mixed powder may include capturing an optical image, capturing a scanning electron microscopy image, capturing a cross-sectional image, performing coulometric titration, and/or performing a pycnometry measurement. The powder material parameter of the mixed powder may be stored in a data repository. As used herein, a data repository is a digital store or archive of structured and/or unstructured information, that is classified and tagged with metadata, i.e., descriptors that are used to define the data. Data repositories may be or may include a single structured database, a set of databases, data warehouse, data lake, and other organization tools for digital information.

In some embodiments, a powder material parameter of the excess powder may be measured. In addition or alternatively, the quality of the mixed powder may be validated by reviewing powder physical transfer data. The powder physical transfer data may include powder storage data, identification of the additive manufacturing system, a number of times the powder was delivered to the additive manufacturing system, and/or number of times the powder was mixed with virgin powder.

Process data may be collected and, optionally, stored in the data repository. The process data may include a laser power during the consolidation step, a velocity of the laser during the consolidation step, or a thickness of a layer formed by the additive manufacturing system. Validating the quality of the mixed powder may also include reviewing the collected process data.

The above steps, starting with connecting the powder container to the additive manufacturing machine, may be repeated at least once with the validated mixed powder. The mixed powder may be sifted through a sieve, prior to repeating these steps.

Powder physical transfer data associated with at least one of the above steps is collected.

The at least one powder material parameter of the mixed powder and/or the powder physical transfer data are stored in a data base, The sensor, tracker, optical device, container sensor, container tracker, and/or container optical device is electronically accessible during each of these steps.

In another embodiment, a first metal powder is consolidated in an additive manufacturing system. After the consolidating step, excess metal powder is transferred to an excess powder container, and a second metal powder is added to form the mixed powder. The first and second metal powders may have the same composition and may be from a single batch, i.e., from a single atomization heat or blended lot provided by the powder manufacturer. In other embodiments, the first and second metal powders are from different batches, i.e., from different atomization heats or different blended lots. The first metal powder may be a virgin metal powder.

Laboratory Testing of Metal Powder

Powders used for additive manufacturing, as described herein, include a plurality of particulates that are metallic. Particulates may have a mean particle size selected from a range of 100 nanometers to 250 micrometers, e.g., 15 µm to 45 µm or <22 µm.

Laboratory tests may be run on samples obtained prior to initial transfer of the metal powder into the additive manufacturing machine (e.g., FIG. 1, step (d)), and/or at any stage within the additive manufacturing cycle. Laboratory tests are conducted by obtaining a retained sample of metal powder. The sample amount may be for example 250 g of powder. Generally, a user tests powder following a recycling step that can include blending, sieving, or otherwise mixing one powder batch with a virgin batch or another used (excess) batch (i.e., recycled powder or a mixed powder including virgin and recycled powder).

A user may define a sampling plan that specifies at which operations steps laboratory tests are to be obtained, and which battery of tests is to be carried out at each step. The test results are transcribed into the powder management software and tagged with the sample identification details to ensure the digital thread and digital fingerprint of the powder is maintained. Alternatively, the test results may be transferred from laboratory equipment into the software data repository via application programming interface (API).

The laboratory data collected on powders may include any combination of: chemical element measurement, particle size distribution (PSD) by sieve measurement or laser diffraction, Hall flow, Carney flow, angle of repose, apparent density, tap density, pycnometry, cross section imaging, digital camera imaging, particle color analysis, optical microscopy imaging, confocal microscopy imaging, scanning electron microscopy imaging, moisture analysis by weight loss, coulometric titration, Karl Fisher titration, rheometry by stability index, basic flow index; morphology by circularity, elongation, convexity, or aspect ratio; and other measurements.

Measurement of the powder can assist the user to determine when the metal powder is degraded or out of specification. For example, overly oxidized powder, contaminated powder, deformed or angular powder may pose a quality risk if it were recycled back into the additive manufacturing process.

The metal powder management system software displays data for the batch of metal powder with details on the full lifecycle, including the different containers and machines the powder may have gone through. It highlights and visualizes the importance of powder container traceability and laboratory test results with regards to the quality of end-use printed parts.

Charging an Empty Powder Container

In embodiments of the current invention, the powder container may be a hopper, vessel, bottle, or another receptacle. For example, container may be a hopper may be constructed of stainless steel, or a bottle may be constructed from plastic. The system is easier to manage with larger containers as opposed to a plurality of smaller bottles. For example, a hopper with an interior volume of 120-240 L is useful for a range of additive manufacturing operations. Sealed containers mitigate the risk of moisture ingress, which is detrimental to metal powder flow. A suitable hopper may be, e.g., the Carpenter Additive Powder Trace™ hopper, available from Carpenter Additive, Philadelphia, Pennsylvania.

Powder containers are charged with metal powder by transferring powder manually or automatically from another vessel. This operation may be conducted under controlled conditions such as an inert atmosphere. Once the powder container is charged, it can be backfilled with an inert gas such as argon to eliminate moisture or oxygen from being in direct contact with the powder.

Monitoring Environmental and Ambient Conditions of the Metal Powder

In embodiments of the current invention, the powder container, e.g., hopper, and other powder handling equipment such as sieves, blenders, additive manufacturing machine transfer lines have electronic sensors to monitor the ambient or in-hopper environmental conditions in real time and in-situ. The sensors may measure any combination of oxygen, temperature, pressure, humidity, powder color using camera in the visual light spectrum, color in the infrared spectrum, flowability of the powder, powder morphology, level of powder in a powder container, mass of powder in a powder container, contamination n the powder, and other characteristics. Contamination may be, e.g., water/humidity, foreign objects, other powder alloys, etc.

The data from the sensors is transmitted wirelessly (e.g., via wifi signal or low-power radio signal) to an electronic receiving hub in the facility that logs the information and stores it along with the batch and hopper identification to ensure traceability.

Figure 5:
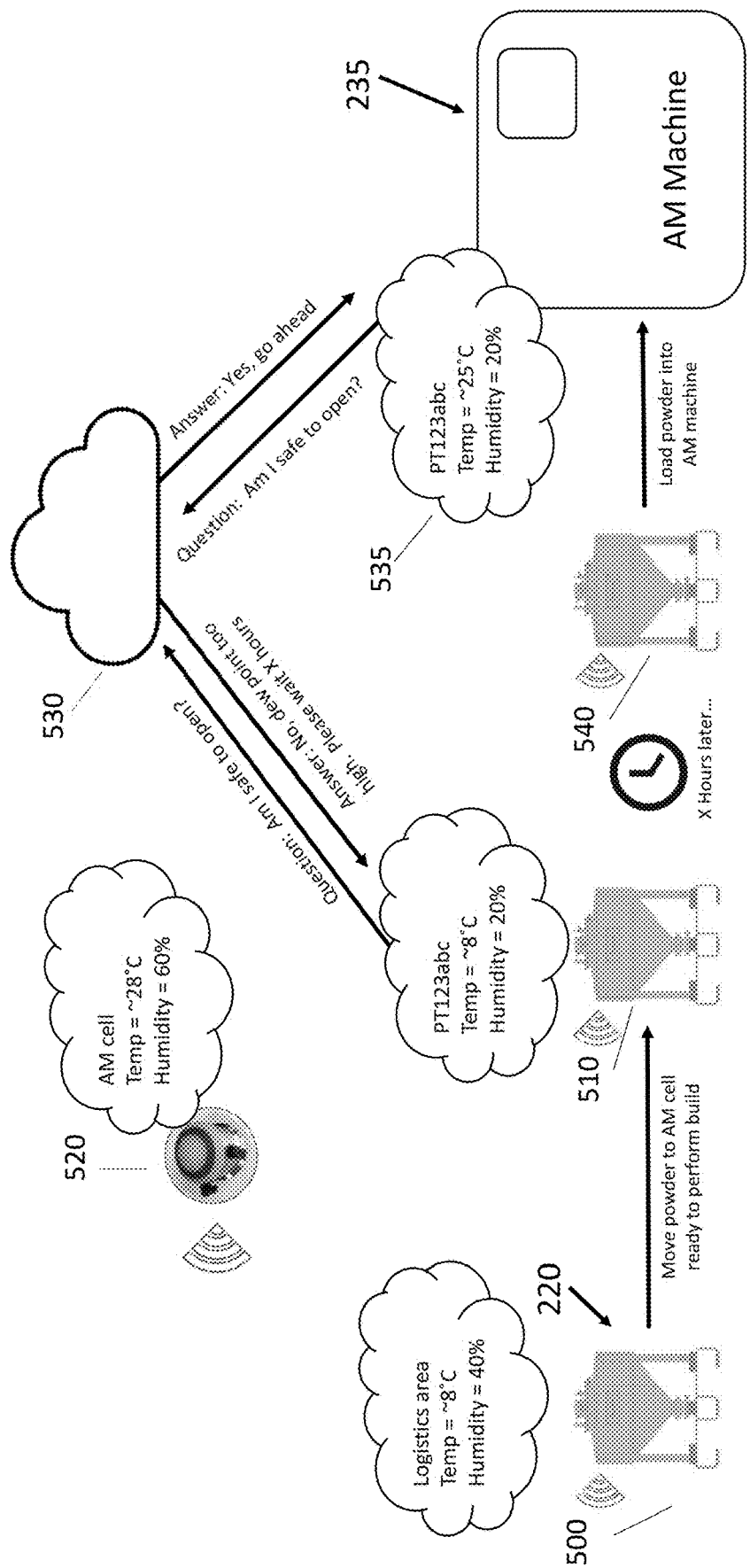
FIG. 5 is a schematic diagram illustrating an exemplary implementation of wireless data transfer, in accordance with an embodiment of the invention.

Referring to FIG. 5, wifi icons illustrate wireless data transfer from smart devices within the closed-loop system to be captured in a data repository, such as a centralized software database. In this illustrative example, a container 220, e.g., a hopper, containing metal powder is moved from a logistics area 500 with temperature of 8° C. and humidity of 40% to the additive manufacturing production cell 510 where the hopper's temperature remains the same and humidity drops to 20%. However, the ambient temperature in the additive manufacturing cell 520 is higher at 28° C. If the operator opens the hopper, the temperature differential may cause humidity to condense on the metal powder and affect its quality. The software-based metal powder management system 530 monitors all the sensors from the logistics area 500 and additive manufacturing production cells 510, 520 and provides a signal to the user that it is not "safe to open" the hopper since it would cause a dewpoint that is too high, and that the user should wait X hours. Once the temperatures have equilibrated 535, e.g., X hours later (at a temperature of 25° C. and humidity of 20%), the software provides a signal 540 that the hopper is "safe to open" and that the metal powder can be loaded into the additive manufacturing machine 235.

In some embodiments, the sensors or equipment may have a visual "go/no-go" signal such as a colored light which alerts the end user to when the metal powder is safe to use or safe to transfer. For example, the "safe to use" condition may be when the powder temperature is equilibrated with ambient additive manufacturing facility temperature, following transfer from another location. If the temperature differential is too large, humidity from the ambient air may condense on the powder below the dewpoint and cause degradation of the powder quality or ingress of unwanted moisture which could negatively affect the properties of additively manufactured components due to poor spreading ("clumping" of the powder), hydrogen embrittlement or other adverse mechanisms. In other embodiments, the visual signal alerts the end user to a potential quality deviation identified in laboratory data or in-situ characterization data from the powder batch.

In other embodiments, the powder container, e.g., hopper also acts as a geolocation tracker using, for example, radio frequency identification (RFID) or global positioning system (GPS) to maintain traceability of the physical location of the powder hopper at any point within the closed-loop system and throughout the powder's lifecycle.

In some embodiments, the powder container may include an optical device, such as a digital camera, infrared camera, or other imaging equipment, to monitor morphology and color of the powder in real time.

Figure 6C:
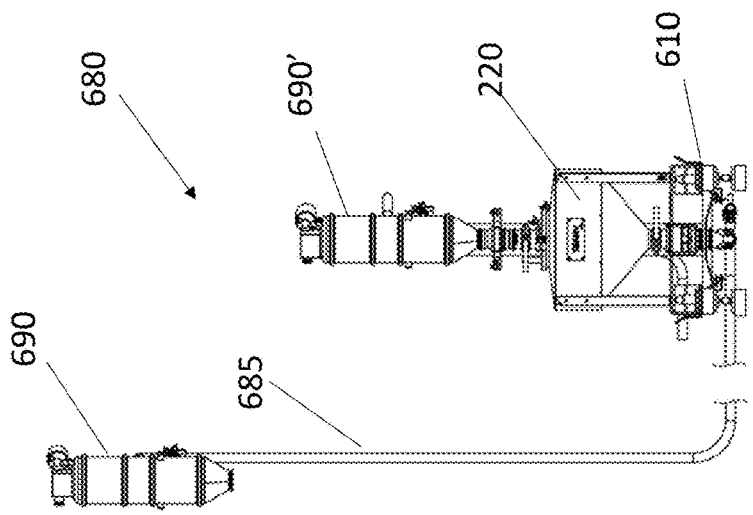
FIG. 6c is a front view of an automated docking station in accordance with an embodiment of the invention.
Figure 6B:
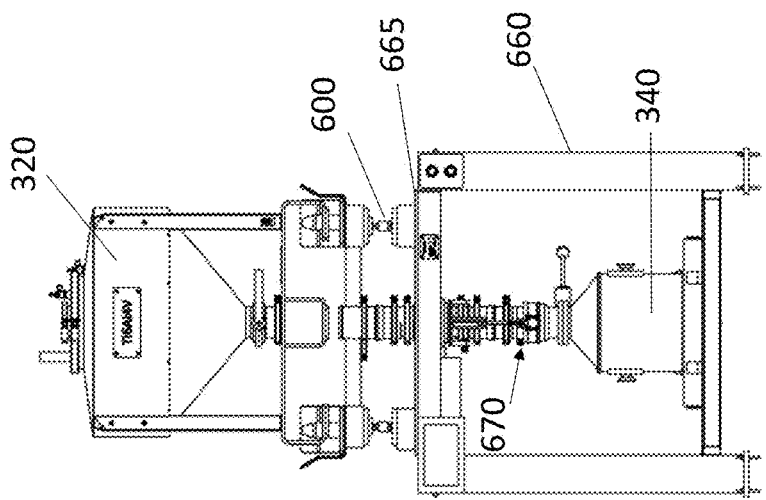
FIG. 6b is a front view of an automated decanting system, in accordance with an embodiment of the invention.
Figure 6A:
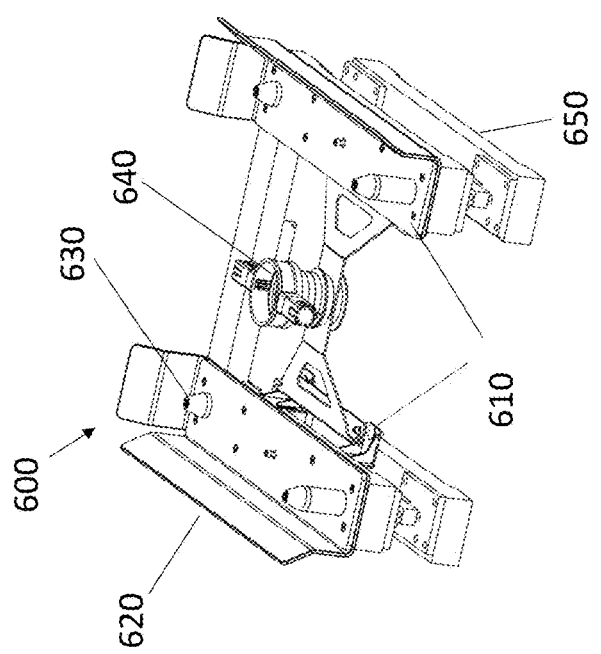
FIG. 6a is a perspective view of a base unit for receiving a powder hopper, in accordance with an embodiment of the invention.

Loading Additive Manufacturing Machine with Metal Powder Using an Automated Powder Transfer System Referring to FIGS. 6a-6c, automated metal powder transfer systems for automated transfer of metal powder into an additive manufacturing machine (e.g., additive manufacturing machine 235, are now described in additional detail. In embodiments of the present invention, metal powder may be loaded directly into an additive manufacturing machine build chamber, dosing volume, or separate silo within the machine. Transfer may occur from a stainless steel metal powder hopper using an automated metal powder transfer system designed to receive the metal powder hopper or other powder container.

The automated metal powder transfer system is designed to be adaptable to a multitude of different additive manufacturing equipment using standard adapters. The layout and footprint of the automated metal powder transfer system is designed to match the size of the hopper or other powder container and minimize floorspace utilization on the manufacturing shop floor. The automated metal powder transfer system is designed to allow the hopper or other powder container to be loaded using a fork-lift vehicle with self-guiding features for the hopper to be placed squarely onto the base. The automated metal powder transfer system forms a sealed connection to the hopper. Via a programmable logic controller (PLC), the user may specific an amount of powder to be transferred into the additive manufacturing machine. The system may move the specified volume or mass of metal powder via vacuum transfer from the hopper into the additive manufacturing machine.

In particular, FIG. 6a is a perspective view of a base unit 600 for receiving a powder container, e.g., a metal powder hopper, in accordance with an embodiment of the invention. The base unit includes two platform arms 610 configured to receive a powder hopper that may contain, e.g., 120-240 liters of metal powder. The platform arms may have vertical sections 620 (edges) on the side and back to enable self-guiding of an incoming powder hopper. Each platform arm may be, e.g., 1 meter-2 meter in length, with a height of, e.g., 0.15 m and a width of, e.g., 0.15 m, and may be made of a rigid material such as stainless steel. The platform arms may be spaced apart sufficiently to enable placement of a bottom of a powder hopper between the vertical sections; for example, a distance between two opposing vertical edges along the two platform arms may be from 0.5 to 1 meter.

Conically shaped guides 630 may be disposed on top surfaces of the platform arms to ensure square placement of the hopper, configured to mate with corresponding openings in a bottom surface of the hopper. In the illustrated embodiments, four guides are shown; it is understood that more or fewer guides may be included.

An adapter flange fitting 640 is disposed in the middle of the base unit assembly. The adapter flange is configured to mate with a corresponding fitting on a hopper; the two fittings may be connected manually or automatically to initiate powder transfer.

The base unit includes a base disposed underneath the platform arms. The base may include two base members 650 disposed below the platform arms. The distance of the two platform arms from the floor may be adjusted. The platform arms and base members of the base unit may be separated from one another, allowing placement of strain gauges or scales therebetween for real-time weight measurement. An example of a suitable strain gauge or scale is the KFH Series gauges, manufactured by Omega.

FIG. 6b is a front view of an automated metal powder transfer system including an automated decanting system 330, in accordance with an embodiment of the invention. The automated decanting system 330 includes the base unit 600 of FIG. 6a placed on top of a frame 660, e.g., a stainless-steel frame with a tray 665 disposed at a bottom portion of the frame. Conventional piping 670 with pipes, valves, and fittings may be disposed in connection with adapter flange of the base unit, allowing the connection of a powder container thereto.

In use, a container 320, e.g., a hopper, may be disposed on the base unit on top of the frame, and a second powder container 340 may be placed on the tray at a bottom portion of the frame. The hopper 320 and powder container 340 may be connected via the adapter flange in the base unit and the piping. Metal powder can be transferred, i.e., "decanted", from the top hopper 320 to the bottom second container 340 using a manual valve, a programmable valve, or other means of dispensing control.

This layout is useful for maintaining closed-loop metal powder control for additive manufacturing machines that use relatively smaller volumes of metal powder (e.g., less than 120 liters). For example, this automated metal powder transfer system may be used with the closed-loop metal powder management system for additive manufacturing of FIG. 3.

Accordingly, in embodiments of the present invention, the automated decanting system 330 shown in FIG. 3 may be used to transfer metal powder from a larger hopper to a smaller container, or vice versa, which may be required when a particular additive manufacturing machine is designed to receive a specific type of container. Instead of directly transferring metal powder from the original hopper into the additive manufacturing machine, the powder is indirectly transferred, first into the alternate container, then into the additive manufacturing machine build chamber, dosing volume, or separate silo within the machine. The transfer of a metered amount of metal powder from a hopper to a separate container may also be controlled by a pneumatic controller or an electronic controller, e.g., programmable logic control (PLC).

FIG. 6c is a front view of an automated metal powder transfer system including a docking system 680 in accordance with another embodiment of the invention. In this docking system, the base unit 610 of FIG. 6a is disposed on the floor. A powder container 220, e.g., a hopper, is disposed on the base unit. A rigid or flexible pipe assembly 685 is fitted to the adapter flange on the base unit, e.g., a KF flange adapter, and connects the hopper to a metal powder vacuum unit 690 or pneumatic vacuum conveyor that may be placed on top of an additive manufacturing machine (not shown). A suitable metal powder vacuum unit is the Multijector® line of pneumatic vacuum conveyors, manufactured by Volkmann GmbH. A second metal powder vacuum unit 690' is placed on top of the hopper to receive returning material, e.g., excess metal powder, through another set of connecting pipework (not shown). This docking system maintains a fully closed loop between the powder container, e.g., hopper, and the additive manufacturing machine.

This layout is useful for maintaining closed-loop metal powder control for additive manufacturing machines that use larger volumes of metal powder (e.g., more than 120 liters). For example, this automated metal powder transfer system may be used with the closed-loop metal powder management system for additive manufacturing of FIG. 2.

In use, metal powder is moved to the additive manufacturing machine by creating a vacuum with the vacuum unit on top of the machine. Excess metal powder may be moved out of the additive manufacturing machine into the container, e.g., hopper, by a vacuum created by the second vacuum unit above the hopper.

There may be an imbalance of pressure between a 'precharged' hopper with an argon back pressure compared to the additive manufacturing machine. A pilot-line system may added to the powder transfer mechanism to balance pressures and avoid overpressure. Moreover, a sealing butterfly valve can be added between the auto docking station and the additive manufacturing machine to maintain an interlock or pressure safety with the machine atmosphere. The system is designed to ground static electricity to avoid sparking during metal powder transfer. Self-checking and alarmed safety systems are added to the automatic docking station which can alert the user to unwanted build up of static electricity.

Referring also to FIG. 2, the automated metal powder transfer system allows a container containing virgin metal powder or other used metal powder to be connected to the 'docked hopper' in-situ in a controlled environment 240 for replenishment and top-up of depleted powder mass.

Figure 7:
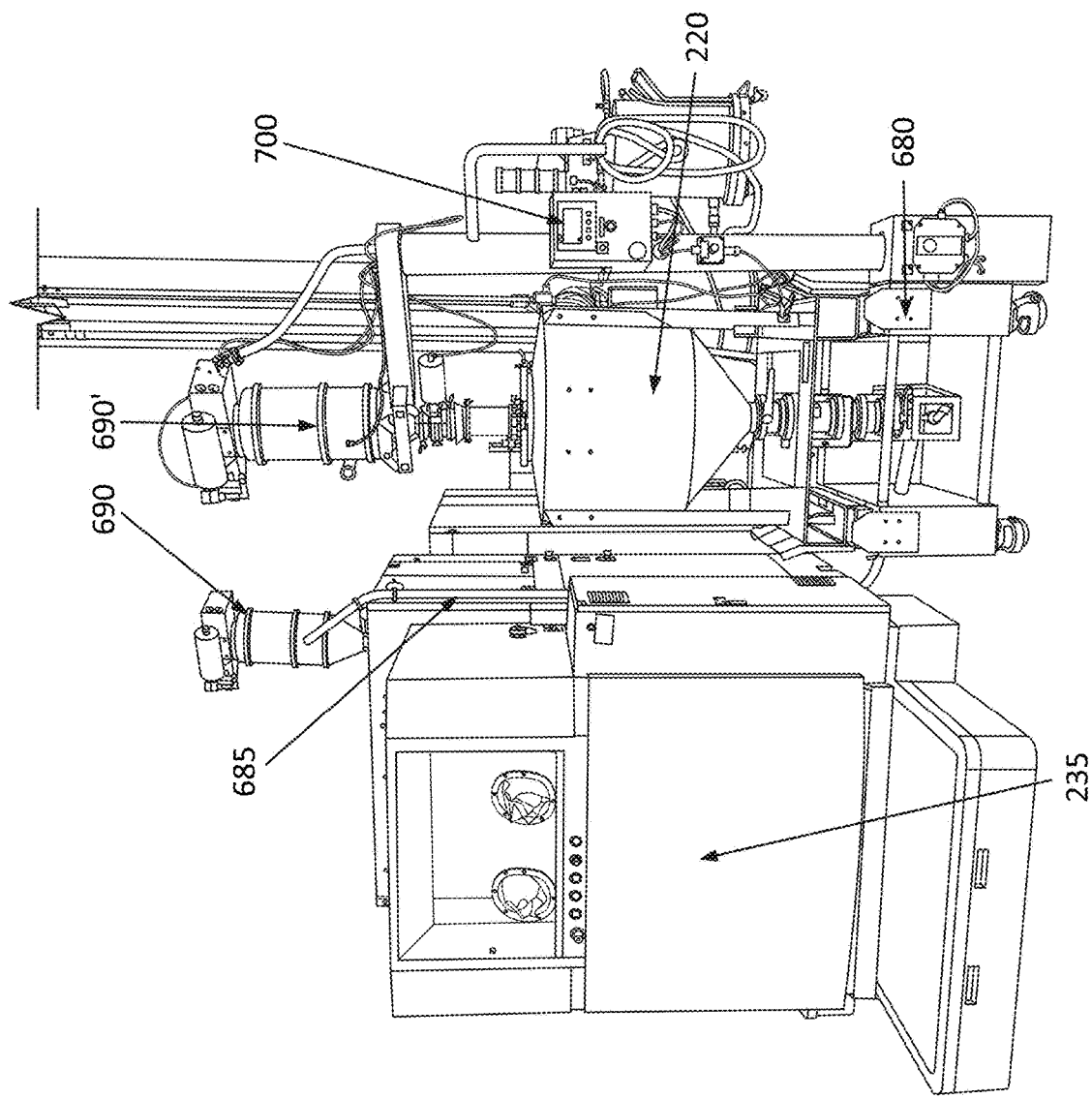
FIG. 7 is a photograph of a closed-loop metal powder management system, in accordance with an embodiment of the invention.

Referring to FIG. 7, a photograph depicts an exemplary closed-loop metal powder management system layout in accordance with an embodiment of the invention. A metal powder hopper 220 sits on an automatic docking system 680 and is connected to an additive manufacturing machine 235 via rigid, stainless steel pipework 685. Metal powder transfer from the container, e.g., a hopper, into the additive manufacturing machine, and vice versa, is achieved using two metal powder vacuum units 690, 690'. The transfer of metered amounts of metal powder is controlled by an electronic controller 700 such as a programmable logic controller, or a pneumatic controller.

Rigid pipework between the automatic docking station and additive manufacturing machine may be used to minimize metal powder travel distance and bend radii that avoids blockages and therefore maximizes uptime. Magnetic clamps for pipework allow the unit to be connected to an additive manufacturing machine without intrusive assembly (e.g., screwed or bolted onto machine). The connecting pipework is designed to not interfere with machine access panels, and minimize footprint, as well as allow for two-way metal powder movement for loading and unloading operations.

Metal powder can "bridge", such that it temporarily self-supports and can block flow in a container. This is a risk in powder equipment without a conical design of hopper outlet, so containers can be designed with the angle of the cone to avoid this situation. Powder can flow in "core" or "mass" flow regimes, i.e., through the middle of a container aperture (core) or along sides of container (mass). Mass flow is desirable for better control and therefore the hopper should be designed to encourage mass flow with a wide range of powder types. This is achieved by having a steep angle on the bottom of the hopper leading to the exit aperture. If virgin metal powder is added on top of a reused batch of metal powder in a container, the mass flow scenario provides a "Last In—Last Out" (LILO) inventory management condition, whereas with core flow the inventory sequence is "Last In—First Out" (LIFO).

Running an Additive Manufacturing Build Cycle

Suitable additive manufacturing methods may be any of the seven categories of additive manufacturing identified by ASTM, i.e., Binder Jetting, Directed Energy Deposition, Mask-Image-Projection-Based Stereolithography, Material Extrusion, Material Jetting, Powder Bed Fusion, and Sheet Lamination, as defined in STM F2792-12a, published by the ASTM Committee F42 on Additive Manufacturing Technologies. Moreover, derivatives and combinations may be used. Examples of additive manufacturing systems suitable for use with embodiments of the invention include, e.g., GE Additive, Renishaw, SLM Solutions, Desktop Metal, etc.

During the additive manufacturing process, key process variables and other information may be monitored, collected, stored, aggregated, processed, and analyzed using the metal powder lifecycle management system software. For example, the system may record any combination of log file readout from the additive manufacturing machine, temperature, humidity, process parameters (including laser speed, hatch spacing, beam size, beam velocity, laser power, and other statistics), machine toolpath, or total incident laser energy (defined as the amount of laser energy integrated over the total irradiated volume within an LPBF build process) may be monitored.

In one embodiment, the system monitors and records the quality of the exhaust gas stream from the additive manufacturing machine. For example, a smoke detecting sensor may be used to record the quality of the exhaust gas in terms of "soot" or burnt particles emanating from the additive manufacturing process.

Recycling, Replenishing, and Retesting Used Metal Powder

A fundamental challenge to users of additive manufacturing is part reproducibility and repeatability throughout managing the metal powder lifecycle, especially when they want to use the metal powder many times. As metal powder is reused, it degrades and hence can affect the quality of the additively manufactured components. Each individual feedstock material and application requires the user to develop a set of unique key process variables (KPVs) that can be used to determine the amount of metal powder recycling that is appropriate. The metal powder management system disclosed herein allows the user to monitor a wide range of statistics and conditions and then use "big data" analysis tools so that the fundamental KPVs can be identified for when the operation moves into series production.

Referring to recycling of powder (h) in FIG. 1 and the sieving stations 250, 350, metal powder blending, or sieving, may be conducted as discrete steps in-situ within or between hoppers in a closed loop to create homogeneous batches. In one example, the used powder is sieved in an extraction station 260, 360 and the oversize particles that are screened out are disposed within a separate hopper to be sent back to the production facility or scrapyard as high value waste. Following blending or sieving, a retained metal powder sample may be obtained to repeat powder laboratory tests, the results of which are loaded into the data collection software along with the traceability information of the batch in question.

In one embodiment, the hopper containing used metal powder is heated using an electric heating jacket, oil jacket, or placed within a heated oven whilst evacuating the hopper by pulling a dynamic vacuum to reduce the moisture content of the powder before it is reused.

Directing of Powder to a Container or Excess Powder Container

After completion of an additive manufacturing step, a decision needs to be make regarding whether excess metal powder goes back to the hopper or to an excess metal powder hopper. The fate of the excess metal powder may be determined by monitoring via statistical process control, KPVs, or continuous monitoring of a variety of characteristics of the powder, including flow, rheology, chemistry, morphology, porosity, contamination, moisture content, recycle/transfer history, process data obtained from additive manufacturing process, materials property data obtained from as-built parts, etc. If any of these resulting measurements are out of specification at any point within the recycling strategy, the metal powder may be directed into an excess metal powder container, e.g., a hopper, for quarantine and/or disposal into the waste stream.

The user may have multiple reuse strategies depending on particular application and feedstock material. In one embodiment, additional virgin metal powder is added and mixed in selectively by blending and/or sieving as the mass of metal powder is depleted in production (which is referred to as a "virgin-add" top up strategy). In another embodiment, multiple batches of reused metal powder can be mixed by blending and/or sieving if the resulting metal powder satisfies the specification conditions determined by the user.

Testing Additively Manufactured Articles and Specimens

Referring to again FIG. 1, the metal powder management system may also collect and store information collected from laboratory tests on additively manufactured sample properties. For example, the tensile mechanical properties, fatigue properties, stress rupture, thermal conductivity, coefficient of expansion, microstructure, chemistry, corrosion properties, magnetic properties, or any other materials data may be collected from additively manufactured and post processed samples.

In one embodiment, the metal powder management system collects a wide range of materials data, recycling data, additive manufacturing process, and post-process (e.g., thermal heat treatment, chemical treatment, hot isostatic pressing, etc.) data. Over many process cycles, the system allows the user to collect statistically significant amounts of data or "big data" to perform analytics including machine learning, reinforcement learning, and other artificial intelligence techniques to glean insights and optimize the end-to-end process for high performance results.

While the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A closed-loop metal powder management method for additive manufacturing, the method comprising the steps of:
    a) obtaining a virgin metal powder suitable for additive manufacturing, the metal powder being disposed in a closed powder container comprising at least one electronically accessible sensor, tracker, or optical device, the closed powder container comprising (i) a shipping powder container in which the virgin metal powder is shipped after manufacture thereof or (ii) a powder container into which virgin metal powder from a shipping powder container was transferred in a controlled atmosphere in a closed loop;
    b) thereafter, disposing the closed powder container in an automated metal powder transfer system to form a sealed connection therebetween and connecting, via a pipe assembly, the powder container to an additive manufacturing system with the automated metal powder transfer system to perform powder transfer in a closed loop, wherein (i) the automated metal powder transfer system is controllable by at least one of a pneumatic or an electronic controller and is adapted to control delivery of a metered amount of metal powder to the additive manufacturing system, (ii) the automated metal powder transfer system comprises at least one platform arm configured to receive the closed powder container, and (iii) the closed powder container remains outside the additive manufacturing system during powder transfer;
    c) delivering the metered amount of metal powder from the powder container through the pipe assembly to the additive manufacturing system;
    d) operating the additive manufacturing system to form at least one layer of the metal powder over a build plate of the additive manufacturing system;
    e) consolidating a portion of the at least one metal powder layer, wherein an excess portion of the metal powder layer remains in powder form;
    f) repeating steps d) and e) at least once;
    g) transferring the excess metal powder from the additive manufacturing system into the powder container, a second powder container, or an internal powder container;
    h) adding virgin metal powder to the excess metal powder in the powder container, second powder container, or the internal powder container to form a mixed powder;
    i) validating a quality of the mixed powder;
    j) repeating steps b)-i) at least once with the validated mixed powder;
    k) collecting powder physical transfer data associated with at least one of steps a)-j); and
    l) storing in a data repository the powder physical transfer data,
    wherein the at least one sensor, tracker, or optical device is electronically accessible during each of steps a)-l), and wherein the virgin metal powder, excess metal powder, and mixed powder is maintained in a controlled atmosphere in a closed loop during steps a)-l).

2. The method of claim 1, wherein the closed powder container comprises the at least one sensor and the least one sensor is adapted to measure at least one of oxygen in the powder container, a temperature in the powder container, humidity in the powder container, pressure in the powder container, color of powder in the powder container, a morphology of the powder in the powder container, a level of the powder disposed in the powder container, a mass of the powder disposed in the powder container, or contamination in the powder disposed in the powder container.

3. The method of claim 1, further comprising maintaining the powder and excess powder under an inert atmosphere during steps a)-l).

4. The method of claim 1, further comprising measuring at least one powder material parameter of the excess powder.

5. The method of claim 1, further comprising sifting the mixed powder through a sieve prior to j) repeating steps b)-i).

6. The method of claim 1, further comprising blending the mixed powder prior to validation.

7. The method of claim 1, wherein step c) delivering metal powder from the powder container to the additive manufacturing system comprises delivering the metal powder to a powder storage silo within the additive manufacturing system, and wherein a quantity of delivered metal powder is sufficient to form at least two layers of metal powder during step d).

8. The method of claim 1, wherein step d) consolidating comprises at least one of binding, sintering, or melting.

9. The method of claim 1, wherein validating the quality of the mixed powder comprises at least one of (i) measuring and assessing at least one powder material parameter of the mixed powder, or (ii) reviewing powder physical transfer data.

10. The method of claim 1, wherein the powder physical transfer data comprises at least one of powder storage data, identification of the additive manufacturing system, a number of times the powder was delivered to the additive manufacturing system, and a number of times the powder was mixed with virgin metal powder.

11. The method of claim 1, further comprising collecting process data associated with at least one of steps a)-j).

12. A closed-loop metal powder management method for additive manufacturing, the method comprising the steps of:
   a) obtaining a first metal powder suitable for additive manufacturing, the first metal powder being disposed in a closed powder container comprising at least one electronically accessible sensor, tracker, or optical device, the closed powder container comprising (i) a shipping powder container in which the first metal powder is shipped after manufacture thereof or (ii) a powder container into which the first metal powder from a shipping powder container was transferred in a controlled atmosphere in a closed loop;
   b) thereafter, disposing the closed powder container in an automated metal powder transfer system to form a sealed connection therebetween and connecting, via a pipe assembly, the powder container to an additive manufacturing system with the automated metal powder transfer system to perform powder transfer in a closed loop, wherein (i) the automated metal powder transfer system is controllable by at least one of a pneumatic or an electronic controller and is adapted to control delivery of a metered amount of metal powder to the additive manufacturing system, (ii) the automated metal powder transfer system comprises at least one platform arm configured to receive the closed powder container, and (iii) the closed powder container remains outside the additive manufacturing system during powder transfer;
   c) delivering the metered amount of metal powder from the powder container to the additive manufacturing system;
   d) operating the additive manufacturing system to form at least one layer of the metal powder over a build plate of the additive manufacturing system;
   e) consolidating a portion of the at least one metal powder layer, wherein an excess portion of the metal powder layer remains in powder form;
   f) repeating steps d) and e) at least once;
   g) transferring the excess metal powder from the additive manufacturing system to an excess powder container comprising at least one excess powder container sensor, excess powder container tracker, or excess powder container optical device;
   h) adding a second metal powder to the excess powder container to form a mixed powder;
   i) validating a quality of the mixed powder in the excess powder container;
   j) repeating steps b)-i) at least once using the validated mixed powder disposed in the excess powder container,
   k) collecting powder physical transfer data associated with at least one of steps a)-j); and
   l) storing in a data repository the powder physical transfer data,
   wherein at least one of the at least one sensor, tracker, optical device, excess powder container sensor, excess powder container tracker, or excess powder container optical device is electronically accessible during each of steps a)-l), and wherein the first metal powder, second metal powder, excess metal powder, and mixed powder is maintained in a controlled atmosphere in a closed loop during steps a)-l).

13. The method of claim 12, wherein the first metal powder and the second metal powder have a same composition.

14. The method of claim 12, wherein the first metal powder and second metal powder are from different batches.

15. The method of claim 12, wherein the first metal powder is a virgin metal powder.

16. The method of claim 12, wherein the closed powder container comprises the at least one sensor and the least one sensor is adapted to measure at least one of oxygen in the powder container, a temperature in the powder container, humidity in the powder container, pressure in the powder container, color of powder in the powder container, a morphology of the powder in the powder container, a level of the powder disposed in the powder container, a mass of the powder disposed in the powder container, or contamination in the powder disposed in the powder container.

17. The method of claim 12, wherein the excess powder container comprises an internal or an external powder container.

18. The method of claim 12, further comprising maintaining the first metal powder, second metal powder, excess metal powder, and mixed powder under an inert atmosphere during steps a)-l).

19. The method of claim 12, further comprising measuring at least one powder material parameter of the excess metal powder.

20. The method of claim 12, further comprising sifting the mixed powder through a sieve prior to j) repeating steps b)-i).

21. The method of claim 12, further comprising blending the mixed powder prior to validation.

22. The method of claim 12, wherein step c) delivering metal powder from the powder container to the additive manufacturing system comprises delivering the metal powder to a powder storage silo within the additive manufacturing system, and wherein a quantity of delivered metal powder is sufficient to form at least two layers of powder during step d).

23. The method of claim 12, wherein step d) consolidating comprises at least one of binding, sintering, or melting.

24. The method of claim 12, wherein validating the quality of the mixed powder comprises at least one of (i) measuring and assessing at least one powder material parameter of the mixed powder, or (ii) reviewing powder physical transfer data.

25. The method of claim 12, wherein the powder physical transfer data comprises at least one of powder storage data, identification of the additive manufacturing system, a number of times the powder was delivered to the additive manufacturing system, and a number of times the powder was mixed with the second powder.

26. The method of claim 12, further comprising collecting process data associated with at least one of steps a)-j).

27. A closed-loop metal powder management method for additive manufacturing, the method comprising the steps of:
   a) transferring in a closed loop, by use of an automated metal powder transfer system, a metered amount of virgin metal powder suitable for additive manufacturing from a shipping container comprising at least one electronically accessible sensor, tracker, or optical device to a closed powder container comprising at least one electronically accessible container sensor, container tracker, or container optical device, wherein during transfer, the shipping container is disposed on a top portion of the automated metal powder transfer system, and the closed powder container is disposed below the shipping container in a bottom portion of the automated metal powder system;

b) thereafter, connecting the closed powder container to an additive manufacturing system to perform powder transfer in a closed loop;
c) delivering metal powder from the powder container to the additive manufacturing system;
d) operating the additive manufacturing system to form at least one layer of the metal powder over a build plate of the additive manufacturing system;
e) consolidating a portion of the at least one metal powder layer, wherein an excess portion of the metal powder layer remains in powder form;
f) repeating steps d) and e) at least once;
g) transferring the excess metal powder from the additive manufacturing system into the powder container, a second powder container, or an internal powder container;
h) adding virgin metal powder to the excess metal powder in the powder container, the second powder container, or the internal powder container to form a mixed powder;
i) validating a quality of the mixed powder;
j) repeating steps b)-i) at least once with the validated mixed powder;
k) collecting powder physical transfer data associated with at least one of steps a)-j); and
l) storing in a data repository the powder physical transfer data,
wherein the at least one sensor, tracker, optical device, container sensor, container tracker, or container optical device is electronically accessible during each of steps a)-l), and wherein the virgin metal powder, excess metal powder, and mixed powder is maintained in a controlled atmosphere in a closed loop during steps a)-l).

* * * * *